United States Patent
Orange et al.

(10) Patent No.: US 9,403,943 B2
(45) Date of Patent: Aug. 2, 2016

(54) COMPOSITE POLYAMIDE SHAPED ARTICLES

(75) Inventors: Gilles Orange, Vourles (FR); Richard Bourdon, Chaponnay (FR); Roland Durand, Saint Bonnet de Mure (FR)

(73) Assignee: RHODIA OPERATIONS, Paris (FR)

( * ) Notice: Subject to any disclaimer, the term of this patent is extended or adjusted under 35 U.S.C. 154(b) by 484 days.

(21) Appl. No.: 12/665,465

(22) PCT Filed: Jun. 17, 2008

(86) PCT No.: PCT/EP2008/057587
§ 371 (c)(1),
(2), (4) Date: Apr. 28, 2010

(87) PCT Pub. No.: WO2008/155318
PCT Pub. Date: Dec. 24, 2008

(65) Prior Publication Data
US 2010/0215920 A1    Aug. 26, 2010

(30) Foreign Application Priority Data

Jun. 20, 2007  (FR) ..................................... 07 04388

(51) Int. Cl.
| | |
|---|---|
| C08G 69/26 | (2006.01) |
| B29C 45/00 | (2006.01) |
| B29C 45/14 | (2006.01) |
| C08J 5/04 | (2006.01) |
| D04H 1/4218 | (2012.01) |
| D04H 1/58 | (2012.01) |
| D04H 1/587 | (2012.01) |
| D04H 1/60 | (2006.01) |
| B29C 70/48 | (2006.01) |
| B29K 77/00 | (2006.01) |
| B29K 105/08 | (2006.01) |

(52) U.S. Cl.
CPC ............ C08G 69/26 (2013.01); B29C 45/0001 (2013.01); B29C 45/14786 (2013.01); C08J 5/04 (2013.01); D04H 1/4218 (2013.01); D04H 1/58 (2013.01); D04H 1/587 (2013.01); D04H 1/60 (2013.01); B29C 70/48 (2013.01); B29K 2077/00 (2013.01); B29K 2105/0809 (2013.01); B29K 2713/00 (2013.01); C08J 2377/00 (2013.01); Y10T 428/24802 (2015.01)

(58) Field of Classification Search
CPC ............................ C08G 69/26; B29C 45/0001
USPC .......................................................... 264/257
See application file for complete search history.

(56) References Cited

U.S. PATENT DOCUMENTS

| | | |
|---|---|---|
| 6,160,080 A | 12/2000 | Cucinella et al. |
| 7,323,241 B2 | 1/2008 | Myard et al. |
| 2006/0234025 A1* | 10/2006 | Myard et al. ............... 428/292.1 |
| 2007/0154710 A1 | 7/2007 | Bradley |

FOREIGN PATENT DOCUMENTS

| | | |
|---|---|---|
| FR | 2743077 A1 | 7/1997 |
| FR | 2852322 A1 | 9/2004 |
| WO | WO 97/24388 A1 | 7/1997 |
| WO | WO 03/014198 A1 | 2/2003 |
| WO | WO 03/029350 A1 | 4/2003 |

* cited by examiner

Primary Examiner — Larry Thrower

(57) ABSTRACT

High fluidity polyamides are used for the impregnation of reinforcing cloth materials, namely, industrial fabrics, which impregnated cloths are converted into composite shaped articles.

19 Claims, No Drawings

COMPOSITE POLYAMIDE SHAPED ARTICLES

CROSS-REFERENCE TO PRIORITY/PCT EARLIER APPLICATIONS

This application is a national phase of PCT/EP 2008/057587, filed Jun. 17, 2008 and designating the United States (published in the French language on Dec. 24, 2008, as WO 2008/155318 A1; the title and abstract were also published in English), which claims foreign priority under 35 U.S.C. §119 of FR 0704388, filed Jun. 20, 2007, each hereby expressly incorporated by reference in its entirety and each assigned to the assignee hereof.

The present invention relates to the use of polyamide of high melt flow employed in the impregnation of reinforcing materials taking the form of cloth of industrial fabrics for the manufacture of composite materials. The field of the invention is that of composite materials and of their manufacturing processes.

PRIOR ART

In the field of high performance materials, composites have assumed a dominating position because of their performance and the savings in weight which they allow. The currently most well known high performance composites are obtained from thermosetting resins, use of which is limited to small-scale to moderate-scale applications, mainly in aeronautics or motor sports, and, in the best cases, which exhibit manufacturing times in the region of approximately fifteen minutes, such as, for example, during the manufacture of skis. The cost of these materials and/or the manufacturing times make it difficult to render them compatible with use in mass production. Furthermore, the use of thermosetting resins often involves the presence of solvents and of monomers. Finally, these composites are difficult to recycle.

One response, in regard to the manufacturing times, is given by composites comprising a thermoplastic matrix. Thermoplastic polymers are generally known for their high viscosity, which constitutes a check as regards the impregnation of the reinforcing materials, generally composed of very dense multifilament bundles. The use of the thermoplastic matrices available on the market results in a difficulty in impregnation, requiring either prolonged impregnation times or significant processing pressures. In the majority of cases, the composite materials obtained from these matrices may exhibit microspaces and unimpregnated regions. These microspaces bring about declines in mechanical properties, premature aging of the material and problems of delamination when the material is composed of several reinforcing layers. This phenomenon of loss of mechanical properties is furthermore accentuated when the cycle times for the manufacture of the composite articles decrease.

The object of the present invention is thus to overcome these disadvantages by providing a composite article which can be manufactured with short cycle times while having good use properties, such as good mechanical properties.

INVENTION

The Applicant Company has discovered, unexpectedly, that the use of polyamides of high melt flow in the manufacture of composite articles makes it possible to obtain articles exhibiting good mechanical properties, such as in particular stiffness, ultimate strength, impact strength and fatigue behavior, even when they are manufactured with shorter cycle times than those normally used and without any other treatment. This makes it possible to provide a composite material exhibiting an advantage of reduction in manufacturing costs, by the use of equipment employing shortened cycle times.

The articles according to the invention exhibit in particular the advantages of stiffness, lightness and ability to be recycled, and a good surface appearance.

A first subject matter of the invention is a process for the manufacture of a composite article comprising at least:

a) a stage of impregnation of a reinforcing cloth with a polyamide composition in the molten state exhibiting a melt viscosity $\eta$ of between 1 and 50 Pa·s, said reinforcing cloth being maintained at a temperature of plus or minus 50° C. with respect to the melting point of said polyamide; and b) a stage of cooling and subsequently recovering the composite article.

More specifically, the invention relates to a process for the manufacture of a composite article comprising at least:

a) a stage of impregnation of a reinforcing cloth with a polyamide composition in the molten state exhibiting a melt viscosity $\eta$ of between 1 and 50 Pa·s, the polyamide exhibiting a molecular weight Mn of greater than 8000; said reinforcing cloth being maintained at a temperature of plus or minus 50° C. with respect to the melting point of said polyamide;

the impregnation of the cloth by the polyamide composition is carried out either:

by injection of the polyamide composition in the molten state onto the cloth; or by bringing the cloth together with the polyamide composition in the powder or film form and then melting said polyamide composition; and b) a stage of cooling and subsequently recovering the composite article.

Cloth is understood to mean a textile surface obtained by assembling yarns or fibers which are rendered integral by any process, such as, in particular, adhesive bonding, felting, braiding, weaving or knitting. These cloths are also denoted as fibrous or filamentary networks. Yarn is understood to mean a monofilament, a continuous multifilament yarn or a staple fiber yarn obtained from fibers of a single type or from several types of fibers as an intimate mixture. The continuous yarn can also be obtained by assembling several multifilament yarns. Fiber is understood to mean a filament or a combination of filaments which are cut, cracked or converted.

The reinforcing yarns and/or fibers according to the invention are preferably chosen from yarns and/or fibers formed of carbon, glass, aramids, polyimides, flax, hemp, sisal, coir, jute, kenaf and/or their mixture. More preferably, the reinforcing cloths are composed solely of reinforcing yarns and/or fibers chosen from yarns and/or fibers formed of carbon, glass, aramids, polyimides, flax, hemp, sisal, coir, jute, kenaf and/or their mixture.

These cloths preferably have a grammage, that is to say weight per square meter, of between 100 and 1000 g/m².

Their structure may be random, unidirectional (1D) or multidirectional (2D, 2.5D, 3D or other).

The polyamide according to the invention exhibits a melt viscosity $\eta$ of between 1 and 50 Pa·s. This viscosity can be measured using a plate/plate rheometer with a diameter of 50 mm under a stepwise shear sweep ranging from 1 to 160 s$^{-1}$. The polymer is in the form of a film with a thickness of 150 µm or else of granules. The polymer is brought to a temperature of 25 to 30° C. above its melting point and the measurement is then carried out.

The molecular weight (Mn) of the polyamides is preferably greater than 8000, more preferably between 8000 and 20 000, having satisfactory mechanical properties and a degree of hold during various shaping processes.

Semicrystalline polyamides are particularly preferred.

The polyamides can be chosen from the group consisting of polyamides obtained by polycondensation of at least one linear aliphatic dicarboxylic acid with an aliphatic or cyclic diamine or between at least one aromatic dicarboxylic acid and an aliphatic or aromatic diamine, polyamides obtained by polycondensation of at least one amino acid or lactam with itself, or their blend and (co)polyamides.

The polyamide of the invention is chosen in particular from the group consisting of polyamides obtained by polycondensation of at least one aliphatic dicarboxylic acid with an aliphatic or cyclic diamine, such as PA 6.6, PA 6.10, PA 6.12, PA 12.12, PA 4.6 or MXD 6, or between at least one aromatic dicarboxylic acid and an aliphatic or aromatic diamine, such as poly-terephthalamides, polyisophthalamides or polyaramids, or their blend and (co)polyamides. The polyamide of the invention can also be chosen from polyamides obtained by polycondensation of at least one amino acid or lactam with itself, it being possible for the amino acid to be generated by the hydrolytic opening of a lactam ring, such as, for example, PA 6, PA 7, PA 11 or PA 12, or their blend and (co)polyamides.

Polyamides of high melt flow can in particular be obtained by controlling their molecular weight during the synthesis thereof, in particular by the addition, before or during the polymerization of the polyamide monomers, of monomers which modify the length of the chains, such as, in particular, diamines, dicarboxylic acids, monoamines and/or monocarboxylic acids. It is also possible to add multifunctional compounds to the polymerization.

Polyamides according to the invention can also be obtained by blending, in particular melt blending, polyamides with monomers which modify the length of the chains, such as, in particular, diamines, dicarboxylic acids, monoamines and/or monocarboxylic acids.

The composition of the invention can also comprise copolyamides derived in particular from the above polyamides or blends of these polyamides or (co)polyamides.

Use may also be made, as polyamide of high melt flow, of a star polyamide comprising star macromolecular chains and, if appropriate, linear macromolecular chains.

The polyamide possessing a star structure is a polymer comprising star macromolecular chains and, optionally, linear macromolecular chains. The polymers comprising such star macromolecular chains are, for example, described in the documents FR 2 743 077, FR 2 779 730, EP 0 682 057 and EP 0 832 149. These compounds are known to exhibit an improved melt flow in comparison with linear polyamides.

The star macromolecular chains comprise a core and at least three polyamide branches. The branches are bonded to the core by a covalent bond, via an amide group or a group of another nature. The core is an organic or organometallic chemical compound, preferably a hydrocarbon compound optionally comprising heteroatoms and to which the branches are connected. The branches are polyamide chains. The polyamide chains constituting the branches are preferably of the type of those obtained by polymerization of lactams or amino acids, for example of polyamide-6 type.

The polyamide possessing a star structure according to the invention optionally comprises, in addition to the star chains, linear polyamide chains. In this case, the ratio by weight of the amount of star chains to the sum of the amounts of star chains and of linear chains is between 0.5 and 1, limits included. It is preferably between 0.6 and 0.9.

According to a preferred embodiment of the invention, the polyamide possessing a star structure, that is to say comprising star macromolecular chains, is obtained by copolymerization of a mixture of monomers comprising at least:

a) monomers of following general formula (I):

b) monomers of following general formulae (IIa) and (IIb):

c) optionally monomers of following general formula (III):

in which:
R₁ is a linear or cyclic and aromatic or aliphatic hydrocarbon radical comprising at least 2 carbon atoms which can comprise heteroatoms,
A is a covalent bond or an aliphatic hydrocarbon radical which can comprise heteroatoms and which comprises from 1 to 20 carbon atoms,
Z represents a primary amine functional group or a carboxylic acid functional group,
Y is a primary amine functional group when X represents a carboxylic acid functional group or Y is a carboxylic acid functional group when X represents a primary amine functional group,
R₂ and R₃, which are identical or different, represent substituted or unsubstituted and aliphatic, cycloaliphatic or aromatic hydrocarbon radicals comprising from 2 to 20 carbon atoms which can comprise heteroatoms,
m represents an integer between 3 and 8.

Carboxylic acid is understood to mean carboxylic acids and their derivatives, such as acid anhydrides, acid chlorides or esters.

Processes for producing these star polyamides are described in the documents FR 2 743 077 and FR 2 779 730. These processes result in the formation of star macromolecular chains, as a mixture with, optionally, linear macromolecular chains.

If a comonomer of formula (III) is used, the polymerization reaction is advantageously carried out until thermodynamic equilibrium is reached.

The monomer of formula (I) can also be blended with a molten polymer during an extrusion operation.

Thus, according to another embodiment of the invention, the polyamide possessing a star structure is obtained by melt blending, for example using an extrusion device, a polyamide of the type of those obtained by polymerization of lactams and/or amino acids and a monomer of formula (I). Such preparation processes are described in patents EP 0 682 070 and EP 0 672 703.

According to a specific characteristic of the invention, the R₁ radical is either a cycloaliphatic radical, such as the tetravalent cyclohexanonyl radical, or a 1,1,1-propanetriyl or 1,2,3-propanetriyl radical. Mention may be made, as other R₁ radicals suitable for the invention, by way of example, of substituted or unsubstituted trivalent phenyl and cyclohexanyl radicals, tetravalent diaminopolymethylene radicals with a number of methylene groups advantageously of between 2 and 12, such as the radical originating from EDTA (ethylenediaminetetraacetic acid), octavalent cyclohexanonyl or cyclohexadinonyl radicals, and the radicals originating from compounds resulting from the reaction of polyols, such as glycol, pentaerythritol, sorbitol or mannitol, with acrylonitrile.

Advantageously, at least two different $R_2$ radicals can be employed in the monomers of formula (II).

The A radical is preferably a methylene or polymethylene radical, such as the ethylene, propylene or butylene radicals, or a polyoxyalkylene radical, such as the polyoxyethylene radical.

According to a specific embodiment of the invention, the number m is greater than or equal to 3 and advantageously equal to 3 or 4.

The reactive functional group of the polyfunctional compound represented by the symbol Z is a functional group capable of forming an amide functional group.

Preferably, the compound of formula (I) are chosen from 2,2,6,6-tetra(β-carboxyethyl)cyclohexanone, trimesic acid, 2,4,6-tri(aminocaproic acid)-1,3,5-triazine and 4-aminoethyl-1,8-octanediamine.

The mixture of monomers which is the source of the star macromolecular chains can comprise other compounds, such as chain-limiting agents, catalysts or additives, such as light stabilizers or heat stabilizers.

The stage of impregnation of the polyamide of high melt flow and of the reinforcing cloth can be carried out in various ways, according to various possible processes. It is entirely possible to impregnate one or more reinforcing cloths.

It is possible, for example, to inject the molten polyamide composition into a molding chamber comprising at least one or more reinforcing cloths. The interior of the molding chamber is at a temperature of plus or minus 50° C. with respect to the melting point of said polyamide. It is possible subsequently to cool the molding chamber and the article obtained, in order finally to recover said article. This process is also known, under the name of resin transfer molding (RTM) process, as a thermoset process, which consists in injecting resin into a closed mold in which reinforcing fibers have been placed beforehand. This process can be carried out under pressure.

It is also possible to produce a composite article according to the invention by a film stacking process, which consists of a temperature compression of a stack of reinforcing cloths and polyamide films. In particular, one or more reinforcing cloths and one or more films of polyamide of high melt flow are brought into contact and the cloths are impregnated by melting the polyamide. The pressures necessary for good assembling are generally greater than 30 bar.

The composite article according to the invention can also be prepared by bringing one or more reinforcing cloths into contact with powder of a polyamide as defined above, in particular fine powder, and said impregnation is carried out by melting the polyamide at a temperature equal to or greater than that of the melting point of the polyamide, optionally under pressure.

After the impregnation of the reinforcing cloth by the polyamide, the article is obtained by solidifying the matrix. Cooling can advantageously be carried out rapidly, so as to prevent significant crystallization of the polyamide, in particular in order to maintain the properties of the article. Cooling can in particular be carried out in less than 5 minutes, more preferably in less than 1 minute. The mold can, for example, be cooled by a circuit of cold fluid. It is also optionally possible to transfer the composite article into a cold mold, optionally under pressure.

The polyamide composition and/or the composite article according to the invention can also comprise all the additives normally used in polyamide-based compositions used for the manufacture of articles. Thus, mention may be made, as examples of additives, of heat stabilizers, UV stabilizers, antioxidants, lubricants, pigments, dyes, plasticizers, reinforcing fillers and agents which modify the impact strength.

Additives for improving the quality of the reinforcing cloths/polyamide interfaces can also be used. These additives can, for example, be incorporated in the polyamide composition, incorporated in the yarns and/or fibers of the reinforcing cloth, present on the yarns and/or fibers of said cloth or deposited on the reinforcing cloth. These additives can be coupling agents, such as those of aminosilane or chlorosilane type, or liquefying or wetting agents, or their combination.

Reinforcing fillers can be incorporated in the polyamide composition. These fillers can be chosen from fibrous fillers, such as short glass fibers, for example, or nonfibrous fillers, such as kaolin, talc, silica, mica or wollastonite. Their size is generally between 1 and 50 μm. Submicronic, indeed even nanometric, fillers can also be used, alone or in supplementing the other fillers.

The present invention relates to an article capable of being obtained by the process of the invention. The article can in particular be a polyamide-based composite article comprising a reinforcing cloth, in which the polyamide exhibits a melt viscosity η of between 1 and 50 Pa·s.

The articles according to the invention preferably comprise between 25 and 65% by volume of reinforcing cloth, with respect to the total weight.

The composite articles preferably exhibit, for a degree of reinforcing of 50% by volume, a breaking stress of greater than 480 MPa and an elastic modulus of greater than 25 GPa (for a void content typically of between 0 and 5%).

The articles of the invention can be finished or semi-finished articles which can also be referred to as preimpregnated articles. It is possible, for example, to carry out the thermoforming of the composite articles in the form of sheets in order to give them a defined shape after cooling. The invention thus relates to composite articles or preforms capable of being obtained by the process according to the present invention.

The articles of the invention can also be structures of sandwich type exhibiting a core inserted between two skins. The composites of the invention can be used to form external layers, by combining them with a core of honeycomb type or foam type. The layers can be assembled by chemical or heat bonding.

The composite structures according to the invention can be employed in numerous fields, such as the aeronautical, motor vehicle, electrical or sports and leisure industries. These structures can be used to produce sports equipment, such as skis, or else to produce various surfaces, such as special floors, partitions, vehicle bodies or billboards. In aeronautics, these structures are used in particular for fairings (fuselage, wing, tailplane). In the motor vehicle industry, they are used, for example, for floors or supports, such as parcel shelves.

A specific language is used in the description so as to facilitate understanding of the principle of the invention. Nevertheless, it should be understood that no limitation on the scope of the invention is envisaged by the use of this specific language. Modifications and improvements can in particular be envisaged by a person conversant with the technical field concerned on the basis of his own general knowledge.

The term and/or includes the meanings and, or and all the other possible combinations of the elements connected to this term.

Other details or advantages of the invention will become more clearly apparent in the light of the examples given below purely by way of indication.

EXPERIMENTAL PART

Different polyamides were used in the examples.

PA C1 (comparative): standard linear polyamide 6 having a viscosity number VN of 256 (ISO 307 in formic acid)

PA C2 (comparative): standard linear polyamide 6 having a VN of 115

PA 3: star polyamide 6 obtained by copolymerization from caprolactam in the presence of 2,2,6,6-tetrakis(β-carboxyethyl)cyclohexanone, according to application WO 97/24388, having a VN of 106

PA 4: star polyamide 6 obtained by copolymerization from caprolactam in the presence of 2,2,6,6-tetrakis(β-carboxyethyl)cyclohexanone, according to application WO 97/24388, having a VN of 94

PA C3 (comparative): standard linear polyamide 6.6 having a viscosity number VN of 134.

PA 5: high melt flow polyamide 6.6 having a viscosity number VN of 97.

PA 6: high melt flow polyamide 6.6 having a viscosity number VN of 104.

These polyamides were characterized by melt viscosity measurements carried out on an Ares plate/plate rheometer (Rheometrics) at 250° C. for polyamides PA 6 and at 280° C. for polyamides PA 6.6. The curves of viscosity as a function of the shear rate show that the polymers under consideration have a newtonian behavior: the viscosity selected is the value at the plateau (between 1 and 150 $s^{-1}$).

TABLE 1

(Polyamides PA 6)

| | Viscosity (Pa · s) |
|---|---|
| PA C1 | 395 |
| PA C2 | 60 |
| PA 3 | 30 |
| PA 4 | 13 |

TABLE 2

(Polyamides PA 6.6)

| | Viscosity (Pa · s) |
|---|---|
| PA C3 | 220 |
| PA 5 | 30 |
| PA 6 | 32 |

The reinforcements used in the examples are in the form of preforms made of glass fabrics cut to the dimensions required for the manufacture of the sheets, that is to say 150×150 mm. The reinforcing cloth used is a fabric made of glass (0°-90°) fiber from Synteen & Luckenhaus resulting from a roving of 1200 tex, exhibiting a grammage of 600 g/m².

Example 1

Preparation of the Composites

The various polymers under consideration were converted by way of examples in the film form. The films are produced by extrusion of granules on a Leistritz twin-screw extruder with a diameter of 34 and an L/D of 34 equipped with a flat die and a film-forming device. The extruder flow rate is 10 kg/h and the rotational speed of the screws is 250 rpm with a profile without venting; the temperature being 250° C. for PA 6 and 270° C. for PA 6.6. The gap between the lips of the die is 300 μm approximately for a width of 30 cm. The delivery rate is 3.2 m/min over rollers regulated at 115° C. The films obtained have a thickness which varies between 160 and 180 μm (spools with a width of 300 mm).

The polymer films are cut out in the form of sheets with dimensions of 150×150 mm from the spools obtained above.

The composite components are prepared by means of a Schwabenthan hydraulic press comprising two temperature-controlled plates (Polystat 300A): heating plates (heating resistances) and cooled plates (circulation of water). A metal mold having a cavity with dimensions of 150 mm×150 mm is used.

In order to produce a composite comprising 80% by weight of glass fibers with the fabric with a grammage of 600 g/m², a preform composed of an alternating stack comprising, in total, 6 sheets of glass fabrics and 5 sheets of polymer is introduced into the mold, the two outer layers being sheets of glass fabrics.

The temperature of the plates of the press is raised beforehand, either to 250° C. for the PA 6 samples or to 290° C. for the PA 6.6 samples, before the introduction of the preform. At this temperature, the pressure is applied between a few bar (5 bar) up to 70 bar and is maintained at this value; ventings are rapidly carried out. The assembly is maintained at the same temperature and pressure, without venting. A series of ventings is again subsequently carried out and then the assembly is again maintained, still at the same temperature and pressure. The mold is then transferred onto the device comprising cooled plates and is maintained under the pressure of 70 bar. Various types of cycle were used: high and medium pressure, short and long times.

The composite components thus obtained have a size of 150×150 mm and a thickness of approximately 2 mm.

Example 2

Characterization of the Composites Based on PA 6

Two types of cycles were carried out: long cycle of 20 min under 70 bar (cycle 1) and short cycle of 5 min under 70 bar (cycle 2). These times correspond to the total duration of the cycle between bringing the mold to temperature and cooling under pressure.

The 150×150 mm sheets are cut up in order to obtain samples with dimensions of 150×20×2 mm. A conditioning treatment is then carried out according to the standard ISO 1110, "Plastics-Polyamides-Accelerated conditioning of test specimens". The water content at equilibrium is obtained by conditioning the composite components with a cycle of 11 days at 70° C. under a relative humidity RH of 62%.

The mechanical properties were obtained at 23° C. and a humidity RH of 50% (stabilization of the test specimens for 48 h at 23° C., RH=50%).

The three-point bending tests at ambient temperature are carried out on parallelepipedal test specimens (150×20×2 mm), according to the standard ISO No. 14125, on a Zwick 1478 machine: distance between rods of 64 mm, crosshead velocity of 5 mm/min. The values for Young's elastic modulus E (GPa) and for max stress σ at peak (MPa) are measured and calculated.

TABLE 3

Results for the components manufactured according to
the long cycle (1) and the short cycle (2)

| | CYCLE 1 | | CYCLE 2 | |
|---|---|---|---|---|
| Polyamide used | Elastic modulus E (GPa) | Max stress σ (MPa) | Elastic modulus E (GPa) | Max stress σ (MPa) |
| PA C1 | 26.5 | 506 | 21.5 | 234 |
| PA C2 | 27 | 507 | 23 | 245 |
| PA 3 | 27 | 540 | 26 | 545 |
| PA 4 | 28 | 611 | 27.5 | 601 |

In the case of a long manufacturing cycle (cycle 1), the mechanical performances obtained are high: max stress (peak) of 506 to 611 MPa, for modulus values between 26.5 and 28 GPa.

For short times (cycle 2), a significant difference in performances between the different polymers becomes apparent. The polymers PA C1 and PA C2 experience a major decline in their properties, in particular the breaking stress, which is less than 250 MPa. In contrast, surprisingly, the polymers PA 3 and PA 4 maintain their performances, whatever the cycle time used.

Example 3

Characterization of the Composites Based on PA 6.6

Two types of cycles were carried out: cycle of 5 min under moderate pressure of 15.5 bar (cycle 3) and cycle of 5 min under low pressure of 4 bar (cycle 4). These times correspond to the total duration of the cycle between bringing the mold to temperature and cooling under pressure.

The 150×150 mm sheets are cut up in order to obtain samples with dimensions of 150×20×2 mm. A conditioning treatment is then carried out according to the standard ISO 1110, "Plastics-Polyamides-Accelerated conditioning of test specimens". The water content at equilibrium is obtained by conditioning the composite components with a cycle of 11 days at 70° C. under a relative humidity RH of 62%.

The mechanical properties were obtained at 23° C. and a humidity RH of 50% (stabilization of the test specimens for 48 h at 23° C., RH=50%).

The three-point bending tests at ambient temperature are carried out on parallelepipedal test specimens (150×20×2 mm), according to the standard ISO No. 14125, on a Zwick 1478 machine: distance between rods of 64 mm, crosshead velocity of 5 mm/min. The values for Young's elastic modulus E (GPa) and for max stress σ at peak (MPa) are measured and calculated.

TABLE 4

Results for the components manufactured according to
moderate pressure cycle (3) and low pressure cycle (4)

| | CYCLE 3 | | CYCLE 4 | |
|---|---|---|---|---|
| Polyamide used | Elastic modulus E (GPa) | Max stress σ (MPa) | Elastic modulus E (GPa) | Max stress σ (MPa) |
| PA C3 | 27 | 510 | 23.5 | 425 |
| PA 5 | 28.5 | 510 | 25 | 510 |
| PA 6 | 28.5 | 575 | 27.5 | 515 |

In the case of a manufacturing cycle of 5 minutes under moderate pressure (cycle 3), the mechanical performances obtained are high: max stress (peak) of 510 to 575 MPa, for modulus values between 27 and 28.5 GPa.

For lower pressures (cycle 4), a significant difference in performances between the different polymers becomes apparent. The polymer PA C3 experiences a substantial decline in its properties, in particular the breaking stress, which is less than 450 MPa. In contrast, surprisingly, the polymers PA 5 and PA 6 maintain their performances, whatever the cycle pressure used.

What is claimed is:

1. A process for the production of a composite shaped article comprising at least:
   a) impregnating a reinforcing cloth with a polyamide composition in the molten state having a melt viscosity η ranging from 1 to 50 Pa·s, the polyamide having a molecular weight Mn of greater than 8,000 and said reinforcing cloth being maintained at a temperature of plus or minus 50° C. with respect to the melting point of said polyamide;
   wherein said reinforcing cloth comprises a textile surface obtained by assembling yarns or fibers, wherein the cloth is composed of reinforcing yarns formed of carbon, glass, aramids, polyimides, flax, hemp, sisal, coir, jute, kenaf or a mixture thereof, and/or fibers formed of carbon, glass, aramids, polyimides, flax, hemp, sisal, coir, jute, kenaf or a mixture thereof,
   wherein the impregnation of the reinforcing cloth by the polyamide composition is carried out either:
      by injection of the polyamide composition in the molten state onto the cloth; or
      by bringing the cloth together with the polyamide composition in the powder or film form and then melting said polyamide composition; and
   b) cooling and subsequently recovering the composite shaped article.

2. The process as defined by claim 1, wherein the melt viscosity is measured employing a plate/plate rheometer having a diameter of 50 mm, under a stepwise shear sweep ranging from 1 to 160 s$^{-1}$, by melting a film of polyamide with a thickness of 150 μm at a temperature ranging from 25 to 30° C. above its melting point.

3. The process as defined by claim 1, wherein the polyamide comprises a star polyamide having star macromolecular chains and, optionally, linear macromolecular chains.

4. The process as defined by claim 3, wherein the star polyamide is provided by mixing and polymerizing, in the presence of the polyamide monomers, at least one polyfunctional compound comprising at least three identical reactive amine or carboxylic acid functional groups.

5. The process as defined by claim 3, wherein the polyamide having a star structure, comprising star macromolecular chains, is produced by copolymerization of a mixture of monomers comprising at least:
   a) monomers having the following general formula (I):

$$R_1 \text{---} [\text{A-Z}]_m \tag{I}$$

b) monomers having the following general formulae (IIa) and (IIb):

$$X-R_2-Y \quad \text{or} \quad \text{(IIa)}$$

 (IIb)

c) and, optionally, monomers having the following general formula (III):

$$Z-R_3-Z \quad \text{(III)}$$

in which:
- $R_1$ is a linear or cyclic and aromatic or aliphatic, hydrocarbon radical having at least 2 carbon atoms and which can comprise heteroatoms,
- A is a covalent bond or an aliphatic hydrocarbon radical which can comprise heteroatoms and which has from 1 to 20 carbon atoms,
- Z is a primary amine functional group or a carboxylic acid functional group,
- Y is a primary amine functional group when X is a carboxylic acid functional group or Y is a carboxylic acid functional group when X is a primary amine functional group,
- $R_2$ and $R_3$, which may be identical or different, are each substituted or unsubstituted and aliphatic, cycloaliphatic or aromatic hydrocarbon radicals having from 2 to 20 carbon atoms and which can comprise heteroatoms, and
- m is an integer ranging from 3 to 8.

6. The process as defined by claim 1, wherein the polyamide is selected from the group consisting of polyamides produced by polycondensation of at least one linear aliphatic dicarboxylic acid with an aliphatic or cyclic diamine or from at least one aromatic dicarboxylic acid and an aliphatic or aromatic diamine, or polyamides produced by polycondensation of at least one amino acid or lactam, or the blend and (co)polyamides thereof.

7. The process as defined by claim 6, wherein the polyamide is produced by addition, before or during the polymerization of the polyamide monomers, of diamine, dicarboxylic acid, monoamine and/or monocarboxylic acid monomers.

8. The process as defined by claim 6, wherein the polyamide is produced by blending, optionally by melt blending, a polyamide with monomers which modify the length of the polymer chains selected from among diamines, dicarboxylic acids, monoamines and/or monocarboxylic acids.

9. The process as defined by claim 1, wherein the reinforcing cloths comprise fibrous or filamentary networks, the yarns and fibers of which are selected from among yarns and/or fibers formed of carbon, glass, aramids, polyimides, flax, hemp, sisal, coir, jute, kenaf and/or mixtures thereof.

10. The process as defined by claim 1, wherein the polyamide composition is injected into a molding chamber comprising at least one reinforcing cloth to carry out said impregnation.

11. The process as defined by claim 1, wherein one or more reinforcing cloths and one or more films of polyamide are together contacted and said impregnation is carried out by melting the polyamide.

12. The process as defined by claim 1, wherein one or more reinforcing cloths and a powder of a polyamide are together contacted and said impregnation is carried out by melting the polyamide.

13. The process as defined by claim 1, wherein the composite shaped article comprises from 25 to 66% by volume of reinforcing cloth, with respect to the total weight of the article.

14. The process of claim 1, wherein said yarns and/or fibers are formed of carbon and/or glass.

15. A process for the production of a composite shaped article comprising at least:
   a) impregnating a reinforcing cloth with a polyamide composition in the molten state having a melt viscosity η ranging from 1 to 50 Pa·s, the polyamide having a molecular weight Mn of greater than 8,000 and said reinforcing cloth being maintained at a temperature of plus or minus 50° C. with respect to the melting point of said polyamide;
   wherein the polyamide is selected from the group consisting of polyamides produced by polycondensation of at least one linear aliphatic dicarboxylic acid with an aliphatic or cyclic diamine or from at least one aromatic dicarboxylic acid and an aliphatic or aromatic diamine, or polyamides produced by polycondensation of at least one amino acid or lactam, or the blend and (co)polyamides thereof,
   wherein said reinforcing cloth comprises a textile surface obtained by assembling yarns or fibers, wherein the cloth is composed of reinforcing yarns formed of carbon, glass, aramids, polyimides, flax, hemp, sisal, coir, jute, kenaf or a mixture thereof, and/or fibers formed of carbon, glass, aramids, polyimides, flax, hemp, sisal, coir, jute, kenaf or a mixture thereof,
   wherein the impregnation of the reinforcing cloth by the polyamide composition is carried out either:
      by injection of the polyamide composition in the molten state onto the cloth; or
      by bringing the cloth together with the polyamide composition in the powder or film form and then melting said polyamide composition; and
   b) cooling and subsequently recovering the composite shaped article.

16. The process according to claim 1, wherein the impregnation of the reinforcing cloth by the polyamide composition is carried out by injection of the polyamide composition in the molten state onto the cloth.

17. The process according to claim 1, wherein the impregnation of the reinforcing cloth by the polyamide composition is carried out by bringing the cloth together with the polyamide composition in the powder or film form and then melting said polyamide composition.

18. The process according to claim 1, wherein the polyamide composition in the molten state has a melt viscosity ranging from 13 to 32 Pa·s.

19. The process according to claim 1, wherein the polyamide composition in the molten state has a melt viscosity of about 13 Pa·s.

* * * * *